(12) United States Patent
Nimmo et al.

(10) Patent No.: US 7,239,948 B2
(45) Date of Patent: Jul. 3, 2007

(54) TYRE PRESSURE MONITORING SYSTEM

(75) Inventors: James Andrew Nimmo, London (GB); Anthony Lawrence Rutter, Bromsgrove (GB); Paul Howarth, Solihull (GB)

(73) Assignee: TRW Limited (GB)

( * ) Notice: Subject to any disclaimer, the term of this patent is extended or adjusted under 35 U.S.C. 154(b) by 0 days.

(21) Appl. No.: 10/917,536

(22) Filed: Aug. 12, 2004

(65) Prior Publication Data

US 2005/0033485 A1    Feb. 10, 2005

Related U.S. Application Data

(63) Continuation of application No. PCT/GB03/00544, filed on Feb. 12, 2003.

(30) Foreign Application Priority Data

Feb. 12, 2002   (GB) .................... 0203230.8

(51) Int. Cl.
 *G06F 7/00*    (2006.01)
(52) U.S. Cl. ............... 701/36; 701/29; 340/438; 340/441; 340/442; 73/146.2
(58) Field of Classification Search ........... 701/29, 701/36; 340/438, 447, 441, 442; 73/146.2
See application file for complete search history.

(56) References Cited

U.S. PATENT DOCUMENTS

| | | | | |
|---|---|---|---|---|
| 4,593,555 A | * | 6/1986 | Krutz et al. ............... 73/116 |
| 4,829,434 A | * | 5/1989 | Karmel et al. ............. 701/59 |
| 5,063,774 A | * | 11/1991 | Burkard et al. ........... 73/146.5 |
| 5,065,134 A | * | 11/1991 | Schmid et al. ............. 340/442 |
| 5,134,880 A | * | 8/1992 | Gerhard .................... 73/146.5 |
| 5,335,540 A | | 8/1994 | Bowler et al. |
| 5,435,363 A | * | 7/1995 | Pender ....................... 152/158 |
| 5,483,827 A | * | 1/1996 | Kulka et al. ............... 73/146.5 |
| 5,612,671 A | | 3/1997 | Mendez et al. |
| 5,764,138 A | * | 6/1998 | Lowe ......................... 340/447 |

(Continued)

FOREIGN PATENT DOCUMENTS

DE   196 08 479   5/1997

(Continued)

OTHER PUBLICATIONS

Unknown, Transponder coil sends tyre pressure data: News from Perllo Technologies, Nov. 23, 2004 (from http://www.electronicstalk.com/news/pet/pet100.html.*

(Continued)

*Primary Examiner*—Cuong Nguyen

(57) ABSTRACT

A tyre pressure monitoring or warning system comprising at least one receiver responsive to signals transmitted by transmitters associated with one or more tyres. The system including a memory which stores a list of identity tags captured by the receiver, and a list of associated confidence values for each identity tag indicative of the confidence that the stored identity tag corresponds to a transmitter that belongs to the vehicle. The list may be split into a member and a candidate list comprising those identity tags that are deemed to refer and that possibly refer respectively to transmitters associated with the vehicle respectively. Initiators may be provided to initiate transmission from the transmitters in order to locate the position of each tyre.

61 Claims, 8 Drawing Sheets

U.S. PATENT DOCUMENTS

| | | | |
|---|---|---|---|
| 5,999,091 A * | 12/1999 | Wortham | 340/431 |
| 6,018,993 A | 2/2000 | Normann et al. | |
| 6,036,179 A * | 3/2000 | Rensel | 267/64.11 |
| 6,087,930 A * | 7/2000 | Kulka et al. | 340/447 |
| 6,161,071 A * | 12/2000 | Shuman et al. | 701/48 |
| 6,181,241 B1 | 1/2001 | Normann et al. | |
| 6,275,231 B1 * | 8/2001 | Obradovich | 345/156 |
| 6,292,096 B1 * | 9/2001 | Munch et al. | 340/445 |
| 6,317,667 B1 * | 11/2001 | Oshiro | 701/29 |
| 6,353,785 B1 * | 3/2002 | Shuman et al. | 701/48 |
| 6,594,566 B1 * | 7/2003 | Skoff | 701/36 |
| 6,622,087 B2 * | 9/2003 | Anderson | 701/209 |
| 6,625,589 B1 * | 9/2003 | Varma et al. | 706/45 |
| 6,675,081 B2 * | 1/2004 | Shuman et al. | 701/48 |
| 6,703,944 B1 * | 3/2004 | Obradovich | 340/903 |
| 6,745,623 B2 * | 6/2004 | Schmitt | 73/146 |
| 6,763,288 B2 * | 7/2004 | Caretta et al. | 701/1 |
| 6,836,719 B2 * | 12/2004 | Andersson et al. | 701/93 |
| 6,915,229 B2 * | 7/2005 | Taguchi et al. | 702/138 |
| 6,975,932 B2 * | 12/2005 | Obradovich | 701/96 |
| 7,162,370 B2 * | 1/2007 | Obradovich | 701/301 |
| 2002/0087250 A1 * | 7/2002 | Pacsai | 701/78 |
| 2003/0050743 A1 * | 3/2003 | Caretta et al. | 701/1 |
| 2003/0076222 A1 * | 4/2003 | Fischer et al. | 340/442 |
| 2004/0059481 A1 * | 3/2004 | Latarnik et al. | 701/36 |
| 2004/0064219 A1 * | 4/2004 | Mancosu et al. | 701/1 |
| 2004/0172180 A1 * | 9/2004 | Bowman | 701/29 |
| 2004/0193340 A1 * | 9/2004 | Katou | 701/29 |
| 2005/0033485 A1 * | 2/2005 | Nimmo et al. | 701/1 |
| 2005/0065681 A1 * | 3/2005 | Watabe | 701/29 |

FOREIGN PATENT DOCUMENTS

| | | |
|---|---|---|
| DE | 198 56 861 | 6/2000 |
| GB | WO 99/61265 * | 12/1999 |

OTHER PUBLICATIONS

Duvenhage, Using a signle MCU-based system for keyless entry and tyre pressure sensing, by embedded.com Jun. 14, 2002 (URL:http://www.embedded.com/show/Article.jhtml?articleID=23901648.*

AutoDax, Remote wireless tire pressure monitor, from http://autofax.com/catalog/pdetail.ph[?prdid=56; printed out on Aug. 30, 2005.*

Marsh, From EDN Europe: safety check: wireless sensors eye tyre pressure, EDN Europe, Jun. 10, 2004.*

Unknown, Tyre Pressure Monitoring Systems, by ToSPA (the Royal Society for the Prevention of Accidents), print out on Aug. 30, 2005.*

Unknown, Piezotag—Tyre Pressure Monitoring System, by PERA, printed out on Aug. 30, 2005 (http://www.pera.com/website/clientsandcasestudies/.*

Unknown, Vulcan Tire Sales: Smartire Passenger Vehicle Demo, from Bulcan Tire Sales www.vulcantire.com, printed out on Aug. 31, 2005.*

Unknown, Measuring tyre pressure for improve road safety, from http://www.hightechfinland.com/2004/print/newmaterialsprocess/vti2.html.*

R. K. Jurgen, The electronic motorist, IEEE Spectrum, vol. 32 Issue 3, Mar. 1995, pp. 37-48.*

B. Parhami, Defect, fault, error, . . . , or failure?, IEEE Transactions on Reliability, vol. 46, Issue 4, Dec. 1997, pp. 450-451.*

S. Byhlin et al., Applying static WCET analysis to automotive communication software, Proceedings, 17th Euromicro Conf. Real-time Systems, Jul. 6-8, 2005, pp. 249-258.*

H. Fujimoto et al., Motion stabilization control of electric vechicle under snowy conditions . . . moment observer, The 8th IEEE International Workshop for Advanced Motion Control, 2004, AMC '04, Mar. 25-28, 2004, pp. 35-40.*

Document Bibliography and Abstract for DE 196 08 479 from the http://v3.espacenet.com/textdoc?DB=EPODOC&IDX=DE19608479&F=0 printed Aug. 10, 2004.

Document Bibliography and Abstract for DE 196 08 479 from the http://v3.espacenet.com/textdoc?DB=EPODOC&IDX=DE19608479&F=0 printed Aug. 10, 2004.

* cited by examiner

TYRE PRESSURE MONITORING SYSTEM

CROSS REFERENCE TO RELATED APPLICATIONS

This application is a continuation of International Application No. PCT/GB03/00544 filed Feb. 12, 2003, the disclosures of which are incorporated herein by reference, and which claimed priority to Great Britain Patent Application No. 0203230.8 filed Feb. 12, 2002, the disclosures of which are incorporated herein by reference.

BACKGROUND OF THE INVENTION

This invention relates to a tyre pressure monitoring system, especially but not exclusively for use in monitoring the pressure within tyres of a road vehicle.

It is known to provide a sensor within each tyre of a vehicle which monitors the pressure within the tyre and a low-powered transmitter which transmits signals indicative of the pressure in the tyre to one or more receivers mounted to the vehicle. The receiver extracts the pressure signal from the received signals and generates a warning signal to the driver of the vehicle in the event that one or more of the sensors indicate that a tyre pressure is below a preset minimum safe level.

In one known system the vehicle is provided with a display which indicates each of the four tyres of the vehicle and their pressure. This can be achieved by placing a separate initiator next to each tyre which prompts the nearest transmitter to send out a signal. Initiating each transmitter in turn allows the receiver to identify which received signal corresponds to which tyre of the vehicle.

A disadvantage of such a system is that the cost of providing an initiator at each tyre, and the electrical cabling needed to connect the initiators to a central processing unit is much greater than that needed with a single receiver and no initiators.

In an alternative it is proposed that each transmitter will transmit along with the pressure signal an identity tag to a central receiver so that the receiver can distinguish between each of the four tyres according to their identity tags. The central receiver has access to a pre-stored set of identity tags which correspond to the transmitters of the four tyres of the vehicle and only listens to signals from transducers that have one of the four tags or codes. If a signal is received that has a different tag it can be ignored as it may be assumed to be associated with a tyre of a different vehicle.

This system is cheaper to implement and has a limited ability to "auto-learn" the identity of the transmitters which are fitted to the vehicle on initiation but can not easily cope with the situation where a tyre is removed from the vehicle and replaced by another. Either the stored list of codes must be updated or a tyre must be fitted using the original transmitter. The wheels can also not be rotated around the vehicle which is a common practice to ensure even wear of the front and rear road tyres.

In a refinement it is further known from EP0769395A1 to provide a system in which the identity of tyres of the vehicle is automatically learnt as identity tags are received. In the disclosed system, the order in which tags are received determines which transmitters are assumed to belong to the vehicle in a first in/first out basis. Subsequently received identity tags are held in a reserve list, again using a first in/first out basis. This is believed by the applicant to be unsatisfactory as it is very likely that the first received tags will include a tag from a tyre belonging to another vehicle. Furthermore, if no transmissions are received from a transmitter after a predetermined elapsed time it is removed from the list and immediately replaced with the first tag in the reserve list. This again is believed to be unsatisfactory.

SUMMARY OF THE INVENTION

It should be understood in the context of the present invention that transducers suitable for producing information required to monitor tyre pressure, and/or transmitters for sending the information to a receiver mounted to the vehicle, could be mounted physically at the wheel, or tyre, or valve associated with the wheel and tyre. Hereinafter the term tyre when referencing the transmitter, should be read such as to include wheel or valve mounted assemblies.

According to a first aspect of the invention there is provided a tyre pressure monitoring system comprising at least one receiver responsive to signals transmitted by transmitters associated with one or more tyres, the system including a memory which stores a list of identity tags captured by the receiver from signals transmitted by the transmitters and a list of associated confidence values for each identity tag indicative of the confidence that the stored identity tag corresponds to a transmitter that belongs to the vehicle.

By confidence we mean the statistical probability that an identity tag belongs to a tyre of the vehicle, based upon the information that is made available to the system. A high confidence indicates that a tyre is likely to belong to the vehicle and a low confidence indicates that a tyre is unlikely to belong to the vehicle.

The system may add newly received identity tags to the list whenever a signal containing the tag is received by the receiver. The identity tags may be ranked in the list according to the value of the confidence value associated with each of the stored identity tags. For example, the confidence value may be expressed as a percentage whereby a high percentage indicates that an identity tag is more likely to correspond to a transmitter on a tyre that belongs to the vehicle than a tag associated with a lower percentage. A tag with a high percentage confidence will be ranked above one with a low confidence.

This enables the system to capture or learn the identities of tyres which belong to the vehicle over time and distinguish from tyres that do not belong to the vehicle.

The memory may store a list of all the identity tags received by the receiver. The identity tags may, for convenience be stored in a list which comprises a member list and a candidate list. Only identity tags that are stored which have attained a corresponding confidence value that meets a first predetermined criterion may be stored in the member list. The other stored tags may be kept in the candidate list. The first criterion may, for example, be that the confidence value is above an acceptable threshold.

This ensures that the member list only contains identity tags which are considered likely to belong to tyres of the vehicle. It is possible, of course, that none of the stored identity tags will have a sufficiently high confidence value to be allocated to the member list, or that the member list may only be partially filled. In this case, provision for the generation of a warning signal may be made to alert the driver that the system is either at fault or is still "learning" the required identity codes and does not yet have sufficient confidence.

The member list may contain as a maximum as many identity tags as there are tyres that belong to the vehicle. For a typical passenger car, the member list will therefore contain 5 identity tags (4 road wheels in use and 1 spare). The system may include means for identifying how many tyres belong to the vehicle which may determine how many corresponding identity tags may be allocated to the member list. For example, a number may be pre-programmed into the memory.

In a refinement, the number of tags that can be allocated to the member list may be varied in the event that a trailer or caravan is attached to the vehicle. This may be achieved by providing a suitable connection between the trailer/caravan and the pressure monitoring system so that the presence of a towed vehicle is automatically detected. Alternatively, the driver may be provided with the option of manually updating the size of the member list.

Allocation of identity tags to the list and the generation of associated confidence values may be performed by a processing unit which forms a part of the system. This may include an input for receiving input signals received by the receiver from any transmitters which are within its range. These transmitters may, of course, not necessarily be associated with tyres that belong to the vehicle but may perhaps belong to the tyres of another vehicle that is travelling or parked alongside it.

The transducer and/or each transmitter may be adapted to transmit a signal which comprises a pressure reading for the tyre associated with the transducer in addition to an identity tag. The tag may, for example, comprise a unique number or code which identifies a transmitter.

To determine tyre pressure, each transmitter may be fitted adjacent to or within a tyre together with one or more sensors which measure pressure and optionally temperature within the tyre. The pressure signal that is transmitted may be a pressure value indicative of pressure (once the temperature had also been taken into account where a temperature sensor is provided), or it may simply comprise a warning signal which is generated whenever the pressure falls below a predetermined safe level. The signal may be a radio frequency (RF) signal or may be transmitted by any other medium e.g. magnetic or electromagnetic means. It may be transmitted periodically together with the identity tag.

The transducer and/or each transmitter may include means for sensing the rotational speed of the tyre within which it is situated. This may comprise a rotational speed sensor associated with the transmitter or the wheel. Alternatively, the receiver may be adapted to analyse received transmissions from a transmitter in order to determine the rotational speed of the wheel in which the transmitter is located. In both cases, this allows differentiation of the spare wheel with respect to the driven wheels, as the spare does not generally rotate.

The processing unit may be adapted to extract the pressure and/or temperature reading from the received signal(s) and extract the identity tag. The processing unit may present only the pressure signals extracted from received signals that are sent by transmitters that are stored in the member list to a display unit.

The provision of confidence values provides a reliable way in which to determine which tyres belong to the vehicle whilst ignoring signals from tyres fitted to other vehicles. It is envisaged that this will reduce the amount of time in which the display will present incorrect information to the driver.

The display unit may have any one of a number of forms and may present the pressure readings audibly or visually to the driver of the vehicle.

Each individual pressure reading for the transmitters in the member list may be presented, or a combined value may be presented, or a warning may be presented in the event that any one of the pressure readings drops below a predetermined level.

The pressure and/or temperature readings may be pre-processed prior to being passed to the display unit.

The processing unit may be adapted to remove stored identity tags from either the member list and/or the candidate list if they have an associated confidence value that meets a second predefined criterion. For example, this second criterion may correspond to a minimum confidence value so that tags may be removed from the memory if the confidence value drops below a predefined level. This allows for the case of a tyre change where a tyre that was fitted to the vehicle is removed.

If a tag is removed from the member list, the system may perform a search of the tags remaining in the memory to see if there are any suitable candidates to add to the member list. If none exist, an error flag may be raised and an alarm issued to the driver.

To determine the confidence value associated with an identity tag (and hence a transmitter) the system may be adapted to monitor one or more parameters of the vehicle and/or the received signals. If a confidence value has not already been allocated then a value may be produced dependent upon the one or more parameters corresponding to a single, or perhaps a series of, received signals with the same identity tag. An identity tag may not be added to the memory without an associated confidence value.

If a confidence value already exists then the value may be adjusted whenever subsequent signals are received in accordance with the monitored parameters at the time of receipt of the later signals. This allows the stored values to move into or out of the master list (where provided) to take into account changing of a wheel and also to allow identity tags that have been learnt in error to be removed from the list.

The system may be adapted to monitor the speed of the vehicle and the confidence value may be dependent upon vehicle speed. The system may determine the vehicle speed by monitoring an output from a speed sensor located at an appropriate place on the vehicle.

The system may allocate a higher confidence value to an identity tag which is extracted from a signal that is received when the vehicle speed exceeds a predefined threshold. For example, a threshold of 10 mph may be chosen. Indeed, the system may be arranged such that new identity tags are not added to the memory at all unless the vehicle speed exceeds or at least meets the threshold.

It is recognised by the applicant that the confidence that should be placed in signals received when the vehicle is stationary, or moving slowly, should be lower than at higher speeds as there is a higher probability that signals will be received from transmitters that do not belong to the vehicle. For example, if the vehicle is left in a busy car park signals from an adjacent vehicle may be repeatedly received over a long period which could otherwise wrongly be assumed to belong to the vehicle. At higher speeds it is more unlikely that two or more vehicles will remain alongside one another.

The processing unit may be adapted to determine the rate of change of the vehicle speed over time. Of course, this could be determined remotely from the processing unit by another unit fitted to the vehicle, with a rate of change value being input to the processing unit. By rate of change we may mean the acceleration of the vehicle.

The confidence value may be higher (or may be increased) if the rate of change of the vehicle at the time of receiving signals exceeds a predetermined threshold. Therefore, a lower confidence value may be allocated to received signals when the vehicle is travelling at a steady state than if it is accelerating or decelerating.

The applicant has appreciated that a vehicle which is accelerating is less likely to repeatedly receive unwanted signals from another vehicle than when it is travelling at a steady speed over an extended period when it may be alongside another vehicle on a multi-lane highway.

The number of times that signals are received which have the same identity tag may be used with the confidence value increasing the more times that a signal is received. For example, if a signal containing the same identity tag has been received many tens of times it may be given a higher confidence value than an identity tag that has only been received once. Where a confidence value has already been allocated a confidence value in the memory this value may simply be increased whenever a new occurrence of that signal is received.

The confidence or increase in confidence value may also be dependent upon the number of other identity tags that are already stored in the memory. For example, if the memory only contains three tags and a new identity tag is received it is relatively likely that the new tag identifies a transmitter that is fitted to a tyre that belongs to the vehicle. If a large number of identity tags are already in the memory the it is less likely that a single occurrence of a new tag will identify a transmitter that belongs to the vehicle.

The confidence value may also be dependent upon the elapsed time between receiving signals having the same identity tag. For example, the confidence values stored in the memory may be reduced at set time intervals, and increased whenever a signal is received. In this way, if a transmitter stops sending signals then its confidence value will be continually reduced, but if it is regularly sending signals its value will not be so reduced.

The transmitters may be adapted periodically to transmit signals containing their identity tag and the period by which the confidence value is reduced may be chosen to be greater than the transmission period. For example, the transmitters may send out signals with a period of, say, 1 to 8 minutes, and the reduction of the confidence value may similarly have a period of between 1 to 8 minutes.

The various parameters that are used to determine the confidence value may be input to one or more algorithms which determine either a new confidence value for a previously unknown identity tag or to modify an existing confidence value for a tag which is known and already store in the memory.

The algorithm(s) may include a weighting factor which is dependent upon the probability of receiving transmitted signals.

The algorithm may determine an additive function for each monitored parameter, with each of the additive functions being added together to form a confidence value.

The system may include a single receiver, which may be conveniently located at any chosen point on the vehicle, and which receives signals from any transducers which are within range. The range should be sufficient for the receiver to pick up signals from at least each of the road wheels fitted to the vehicle. It may also have sufficient range to pick up signals sent from the spare wheel of the vehicle.

Such a simple one-receiver system will have the ability to auto-learn, i.e. to automatically learn over time which transducers belong to the vehicle. It will not, however, be able to distinguish between a wheel that is in use and the spare wheel. This is actually believed to be an advantage in many situations as it is worth knowing what condition the spare wheel of the vehicle is in.

In a refinement, full auto-location may be achieved by providing at least one initiator which is associated with each wheel. For instance, an initiator may be fitted to each wheel arch of the vehicle so that it is relatively close to the transmitter/sensor associated with each tyre. By initiator we mean a device which sends out a prompt signal to any transmitters within its range, the transmitter being adapted to send a signal including its identity tag back to the receiver in response to the prompt from the initiator. The initiator should have a limited range, or should be directional such that it only initiates the transmitter of the vehicle tyre nearest to the initiator.

Where the transmitters comprise low frequency (LF) devices, the initiator may comprise a LF coil which transmits a burst of LF radiation when energised. The transmitter, upon receiving this radiation, issues a "prompted" typically RF return signal.

These "prompted" return signals may be in addition to periodic signals which include the identity tag. For the purpose of auto-locating, only the prompted signals may be used with the periodic signals being used only for the purpose of auto-learning (i.e. allocating the identity tags to the list). This allows, for example, the system to learn both the location of transmitters at the "prompted" tyres and also the spare even when the spare is not provided with an initiator since it will still send out periodic signals which can be learnt.

The processing unit may be adapted to operate each initiator unit in turn and listen for received signals following a prompt from an initiator. If no signals are received within a set time duration either an error may be signalled or the processing unit may restart the process for that initiator. Similarly, if transmissions are received from more than one transmitter within a set time duration (i.e. multiple different identity tags are received) either an error may be signalled or the processing unit may restart the process for that initiator. If transmissions are only received from a single transmitter within a set time duration, either the transmitter identity tag is stored in memory as a member together with the location of the initiator used and assigned the maximum possible confidence value, or the processing unit may require confirmation of the received identity tag and re-activate the initiator.

If more than one signal is received following a prompt from an initiator, an error signal may be issued. Similarly, if no signals are received following a prompt then an error signal may be issued.

In an advantageous embodiment, a combination of the data from the return signal and from the rotational speed of the wheel with which the transmitter is associated provides confirmation that the correct wheel (particularly spare as against road wheel) has been located.

The combination of an auto-locate and an auto-learn feature within a tyre pressure monitoring system forms the second aspect of the invention.

Thus, in accordance with a second aspect of the invention there is provided a tyre pressure warning system comprising:
   an initiator associated with each of the road wheels of the vehicle which are in use;
   a receiver which receives signals from any transmitters which are within an operational range of the receiver,
   a processor which processes the received signals, and;
   a memory in which is stored a list of identity tags captured by the receiver from the received signals and a list of associated confidence values for each identity tag indicative of the confidence that the system has that the identity tag corresponds to a transducer that belongs to the vehicle;

the processor being adapted to learn which transmitters belong to the vehicle from the stored confidence values, and to learn where the learnt transmitters are located on the vehicle by monitoring in turn signals received from the transmitters in response to a prompt from each initiator.

The receiver may be adapted to receive signals over a range which includes all tyres fitted to the vehicle as well as those that are in use. This enables the system to auto-learn all the tyres and with the use of initiators to also auto-locate the tyres which are in use. It may further be adapted to receive signals from a trailer or caravan fitted to the vehicle by ensuring that it has sufficient range. This will, of course, also depend on the transmission strength of the signals from the transmitters which must be carefully chosen.

Each of the tyres fitted to the vehicle may be provided with a transmitter, such as a radio frequency (RF) transmitter. Each transmitter may be powered by a battery located within the tyre, or by other means.

According to a final aspect, the invention provides a vehicle which includes a tyre pressure monitoring/warning system, according to the first and/or second aspect of the invention.

Other advantages of this invention will become apparent to those skilled in the art from the following detailed description of the preferred embodiment, when read in light of the accompanying drawings.

DETAILED DESCRIPTION OF THE INVENTION

Figure 1:
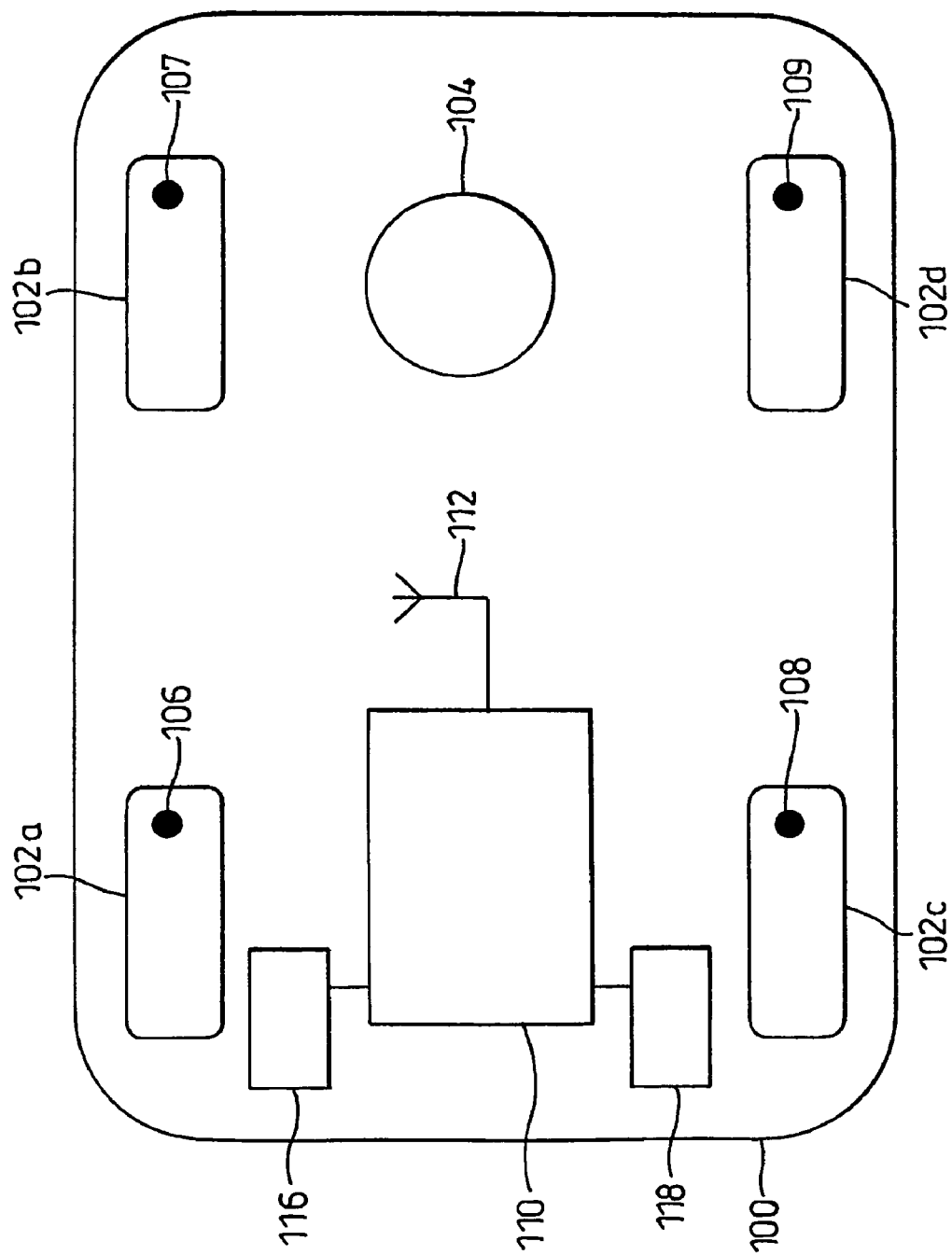
FIG. 1 shows a schematic plan view of a vehicle fitted with the system of a first embodiment of the current invention.
Figure 7:
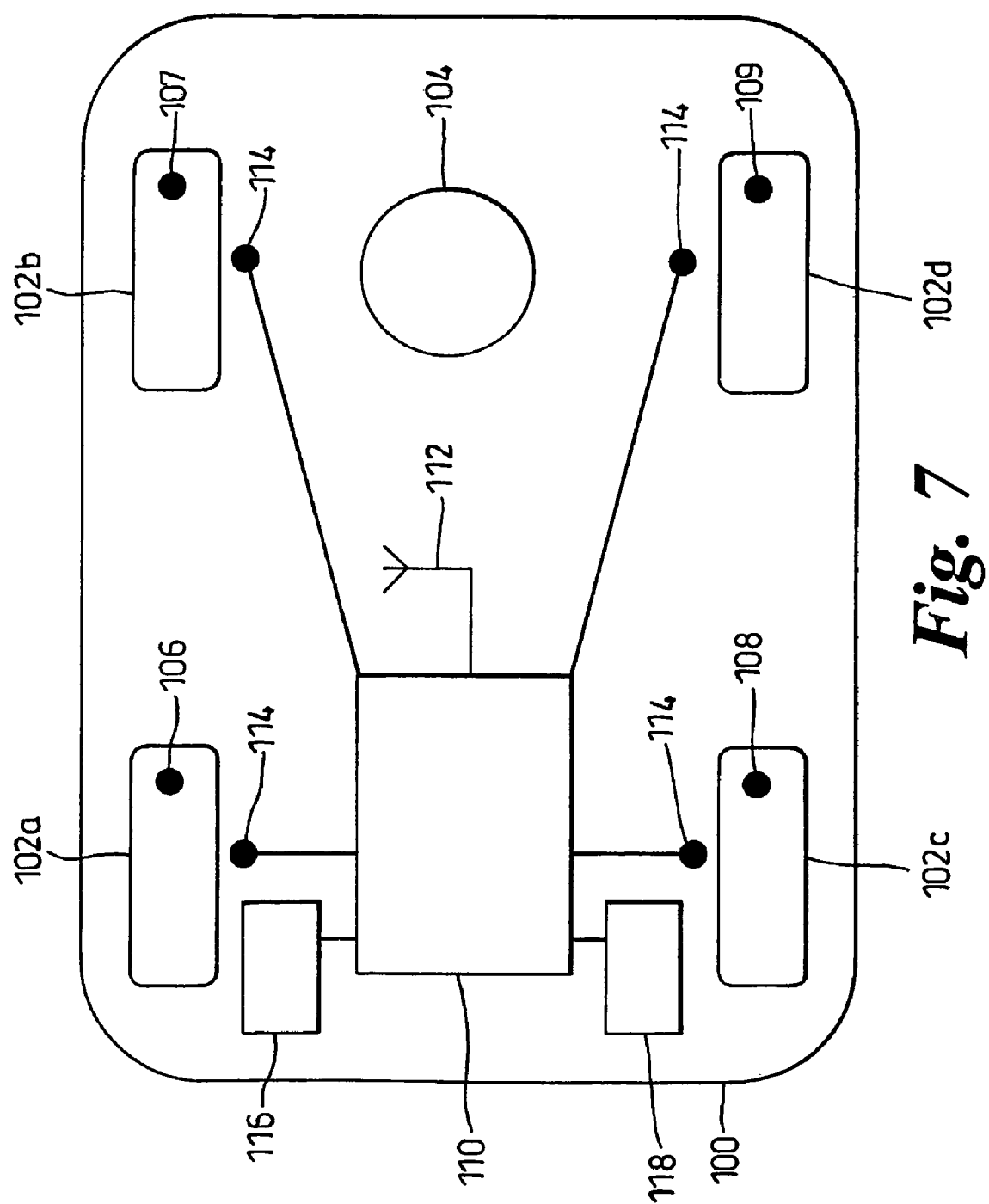
FIG. 7 shows a schematic plan view of a vehicle fitted with the system of a second embodiment of the current invention.
Figure 8:
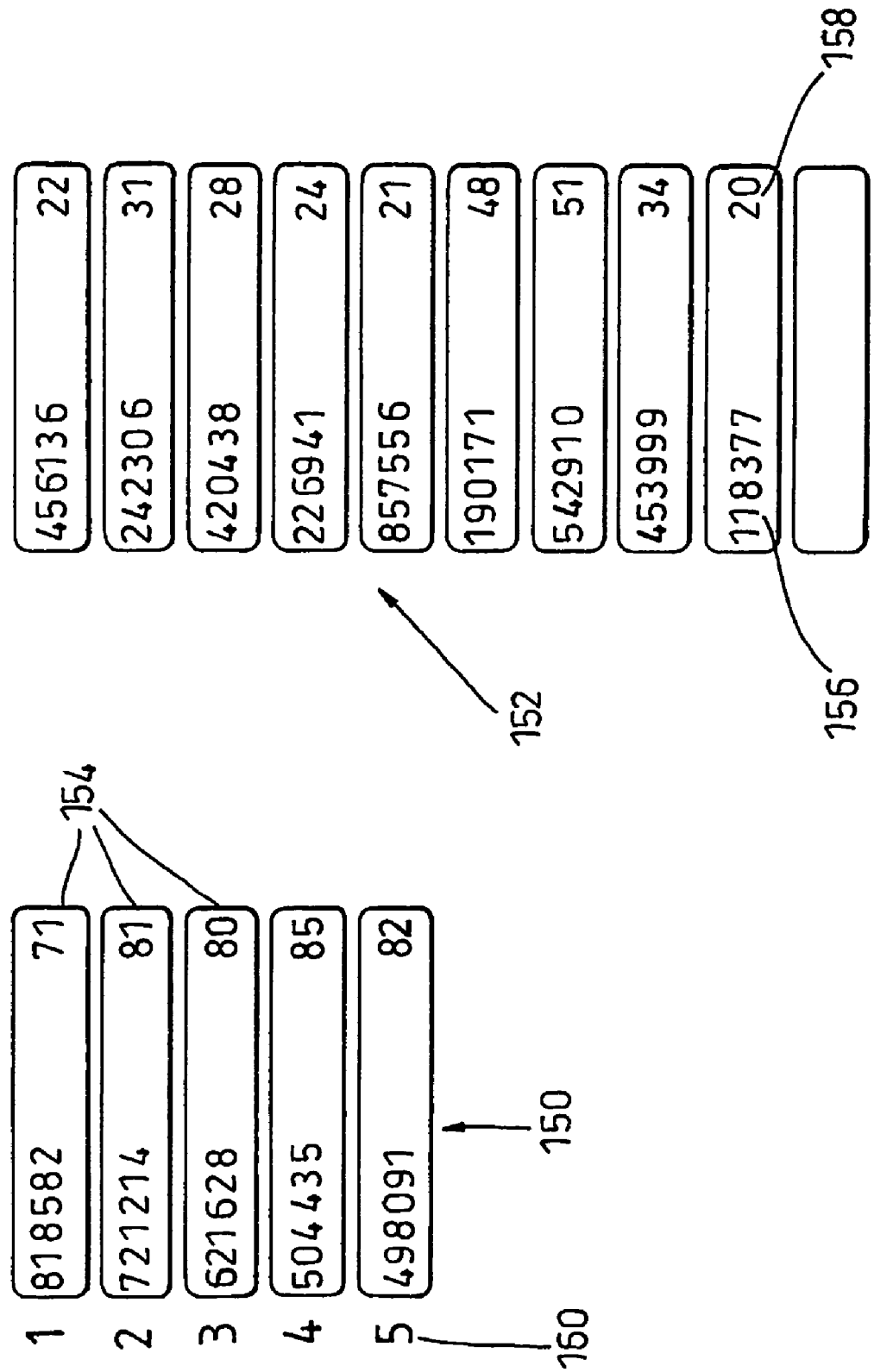
FIG. 8 shows details of two lists kept by the control unit of the system of FIG. 7.

A vehicle 100 fitted with a tyre pressure monitor system according to a first embodiment of the invention may be seen in FIG. 1 of the accompanying drawings, and a more detailed system according to a second embodiment is illustrated in FIG. 7 of the accompanying drawings. For ease of explanation, features of the first and second embodiments which are common to both embodiments have been given like numbers.

The first embodiment is a similar system to that of the second embodiment, except that it lacks the features necessary to perform the "auto-locate" feature of the second embodiment. Accordingly, the system lacks the initiator modules 114 of the second embodiment of the invention. Furthermore, the member list 150 (the lists 150, 152 of the first embodiment being shown in FIG. 2) lacks the indices 160 given to each item 154 in the second embodiment.

The system of the first embodiment operates in a manner identical to that of the second embodiment of the invention, with the exclusion of all auto-locate features. In its simplest form, it is therefore not possible to associate the members with wheel positions or to distinguish the spare wheel 104 from the road wheels 102. However, it is possible to display tyre pressure data relating to the members as, say, a list of five pressures, but with no locations associated with them.

Nonetheless, it is envisaged that in one modification the first embodiment of the invention may be modified to incorporate some, but not all, of the additional features of the second embodiment such as the ability to sense the rotational speed of the wheel in order to learn and distinguish between the spare wheel and the driven wheels.

In this specific description, reference is made predominantly to the refined system of FIG. 7 with its additional functionality.

FIG. 7 shows the more elaborate system fitted to a vehicle 100 (such as a family car) fitted with a tyre pressure monitor system according to a second embodiment of the current invention. The vehicle 100 is fitted with four road wheels 102a, 102b, 102c, 102d adapted to drive the vehicle 100 along a road and one spare wheel 104 for use in case one of the road wheels fails. It is, however, envisaged that the system can be extended to a vehicle having any number of wheels. Each of the wheels 102, 104 is fitted with a tyre supplied with a device comprising a pressure sensor/transducer, temperature sensor/transducer, rotational speed sensor/transducer and transmitter 106, 107, 108,109 powered by a battery (not shown) or alternative means. These devices measure and transmit, using radio waves, the temperature and pressure of the air within the tyre and the rotational speed of the respective wheel 102a-d and 104 and a unique ID 156 that identifies the transducer 106, 107,108,109. The spare wheel is also fitted with a transducer and associated transmitter(not shown).

A processor or control unit 110 is fitted to the vehicle 100 and is supplied with a receiver having an antenna 112 that picks up the signals transmitted from the transmitters 106, 107, 108 and 109 as well as signals from any other nearby devices (not shown) which may be fitted to other vehicles. The control unit 110 is also provided with four low frequency. initiator modules 114 each positioned near one of the road wheels 102 such that each initiator module 114 transmits a low frequency signal that causes the transmitter of the respective road wheel 102 to transmit the measured pressure signal along with a unique identity tag. The control unit 110 performs all the calculations necessary for the system to perform, and also stores any necessary data.

Each transmitter is adapted to transmit periodically (with a period of approximately 6 minutes) the pressure and temperature within the tyre of the wheel 102a-d, 104 with which it is associated. Each transmitter 106, 107,108,109 will also transmit when prompted to do so by an initiator module 114, the rotational speed of each wheel. Furthermore, if the temperature or pressure within the respective tyre goes outside predetermined safe limits, then the transmitter enters an alert mode at which point it transmits four consecutive transmissions. Whilst in an alert state, the data transmitted by a transmitter includes a signal to that effect. Furthermore each transmitter 106, 108 is able to transmit a warning when a fault, such as a low battery, occurs.

The system is equipped with vehicle speed sensing means 116,118 that outputs to the control unit 110 a value indicative of the speed at which the vehicle 100 is moving. The output of this speed sensing means 116 is also used to calculate the acceleration or deceleration of the vehicle 100.

Figure 2:
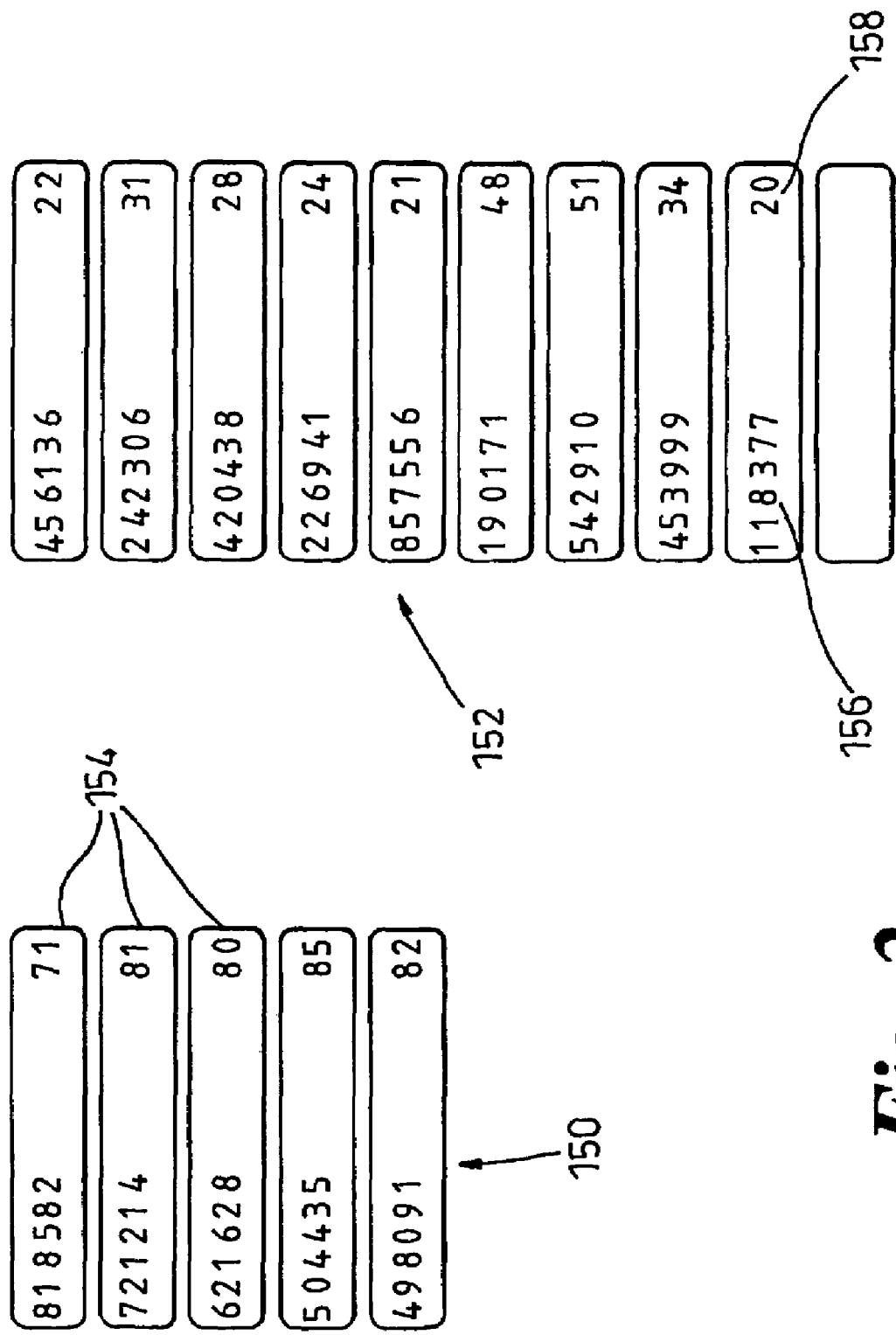
FIG. 2 shows details of two lists kept by the control unit of the system of FIG. 1.

The control unit 110 keeps a record in an area of electronic memory of a member list 150 and a candidate list 152 of transmitters 106, 108 from which it has received transmissions, as shown in FIG. 2. Each list 150, 152 consists of a number of items 154, each item 154 corresponding to one transmitter 106, 108 from which the system has received a transmission. The items 154 each comprise a record of the ID 156 transmitted by the transmitter 106, 108 (shown as a six digit number in the attached drawings) and a level of confidence 158 (being an integer between 0 and 100) which the system has that that the transmitter 106, 108 having that particular ID 156 belongs to the vehicle 100.

The member list 150 contains a list of items 154 (hereinafter "members") corresponding to transmitters 106, 107, 108, 109 which the system has sufficient confidence 158 in to suggest that they belong to a wheel 102*a-d*, 104 associated with the vehicle 100. The member list 150 has five members, that being the number of wheels 102, 104 being associated with the vehicle 100 in this example. Of course, if the vehicle had more wheels the member list may contain more items. The member list 150 has an index 160 associated with each item 154, the index 160 corresponding to a position in which the wheel 102, 104 having a transmitter 106, 107 108, 109 with the ID 156 of the item 154 is believed to be. Index 160 positions 1 to 4 correspond to the four road wheels 102 whilst position 5 corresponds to the spare wheel 104.

The candidate list 152, on the other hand, contains an unindexed list of items 154 (hereinafter "candidates") corresponding to transmitters that the system has received transmissions from but in which the system lacks sufficient confidence 158 to be certain that the transmitters are those belonging to wheels 102, 104 associated with the vehicle 100. Furthermore, any place (in either list 150, 152) may be empty, as shown in the final item 154 of the candidate list 152. Although, for clarity, the exemplary candidate list 152 shown in FIG. 2 of the accompanying drawings shows space for only 10 items 154, it is envisaged that the maximum number of items 154 in the candidate list 152 will be at least 25.

The member list 150 is stored by the control unit 110 in non-volatile RAM (NVR) such that even with the vehicle switched off and the system powered done, the member list 150 is remembered. However, as it is not as important to keep track of the possible candidates, the candidate list 152 is not kept in NVR and as such is forgotten should the system be switched off.

In use, the control unit 110 continually listens out for transmissions from any transmitters which are within detection range. The transmitters 106, 107,108, 109 transmit at intervals of approximately 6 to 8 minutes. When a transmission is received, the system checks to see if the ID 156 is already in one of the lists 150, 152. If it is, then the confidence 158 of the corresponding list item 154 is increased. The increase only occurs if the speed of the vehicle 100 is measured as greater than a predetermined "learn speed threshold" (say 10 mph). This prevents the system storing many, possibly superfluous, list items 154 when the vehicle 100 is parked. The increment in confidence 158 added to the item 154 corresponding to the received transmission, given that the vehicle 100 is moving at a speed greater than the learn speed threshold, is the sum of:

(a) a constant basic learn weight (of, say, 25);

(b) a function of the number of transmissions previously received from the ID 156 of the transmission, which is envisaged to be a step function being zero for numbers of transmissions less than a received transmission threshold of 3 and being 15 for numbers of transmissions being more than that threshold;

(c) if the speed of the vehicle 100 moving at a speed of more than a lower speed confidence threshold, a linear function given by $$\left(\frac{|v| + c}{u}\right)c$$

where $|v|$ is the absolute speed of the vehicle 100 in miles per hour, c is a constant speed confidence tuning parameter of say 17 and u a constant upper speed threshold which is the maximum average speed of the vehicle 100 in normal use, say 130 mph;

(d) a linear function of the acceleration of the vehicle 100, given by $$\left(\frac{|\Delta v|}{u}\right)d$$

where $|\Delta v|$ is the change in speed in miles per hour of the vehicle 100 between two samples of the speed, u is the upper speed threshold described above and d is a constant acceleration confidence tuning parameter of say 10; and (e) if the total number of items 154 in both lists is less than or equal to the number of wheels 102, 104 associated with the vehicle 100 (that is, 5), a constant transmitter confidence tuning parameter of, say, 5, otherwise a function given by:

$$\frac{1}{n}t$$

where n is the total number of items 154 on both lists, and t is the transmitter confidence tuning parameter.

Term (a) adds a constant to the confidence 158 of the item 154 corresponding to the transmission received. This ensures that, as the confidence 158 is determined over time as described below, the system always maintains the confidence 158 of the item 154 if transmissions from the respective transmitter 106, 108 are received.

Figure 3:
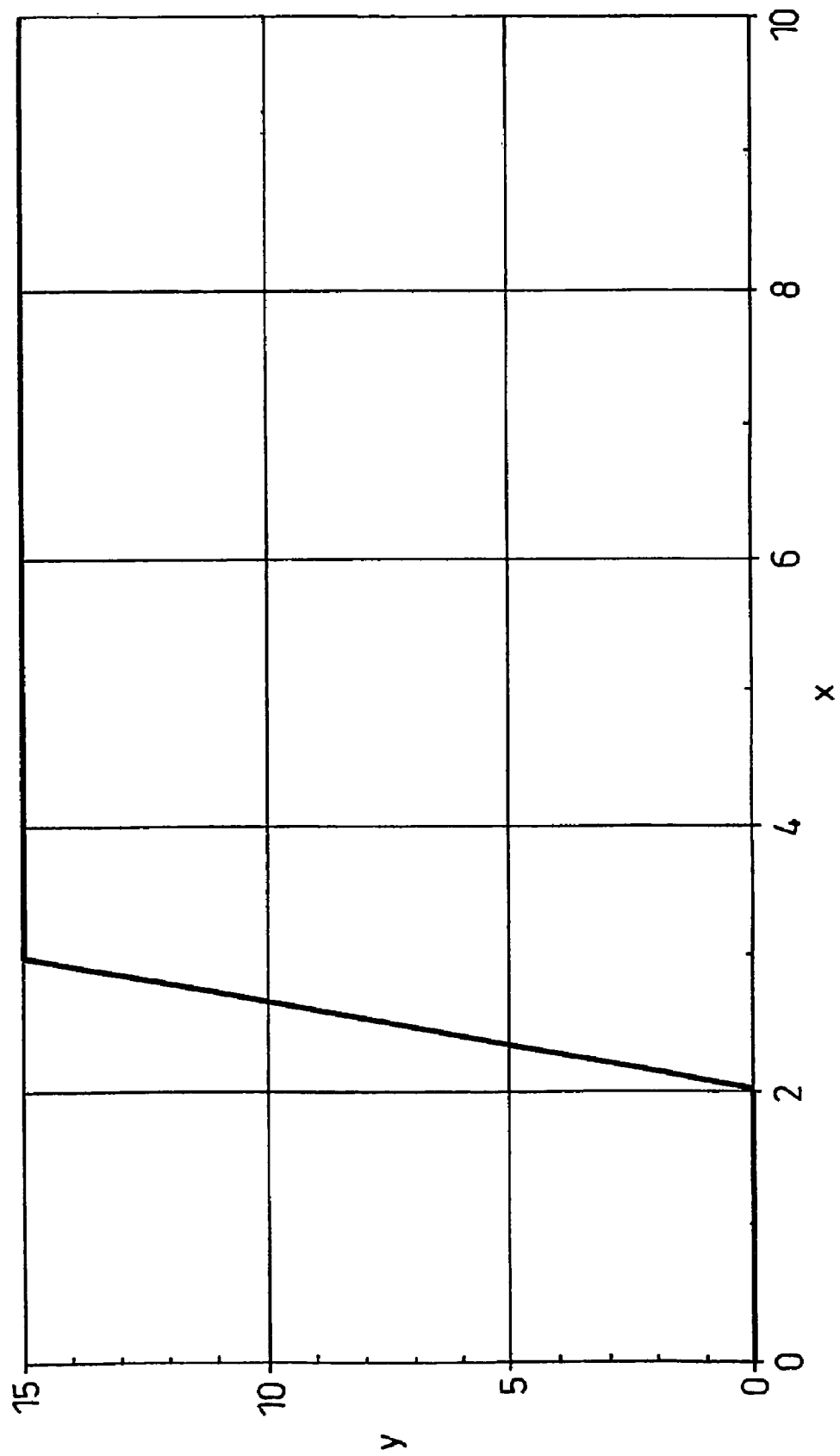
FIG. 3 shows a graph of the confidence additive function on number of transmissions received.

Term (b) increases the confidence 158 more if transmissions from the respective transmitter 106, 108 have been seen several times. The increment due to this term can be seen in FIG. 3, where the x-axis represents the number of transmissions from the particular transducer 106, 108 and the y-axis represents the confidence increase.

Figure 4:
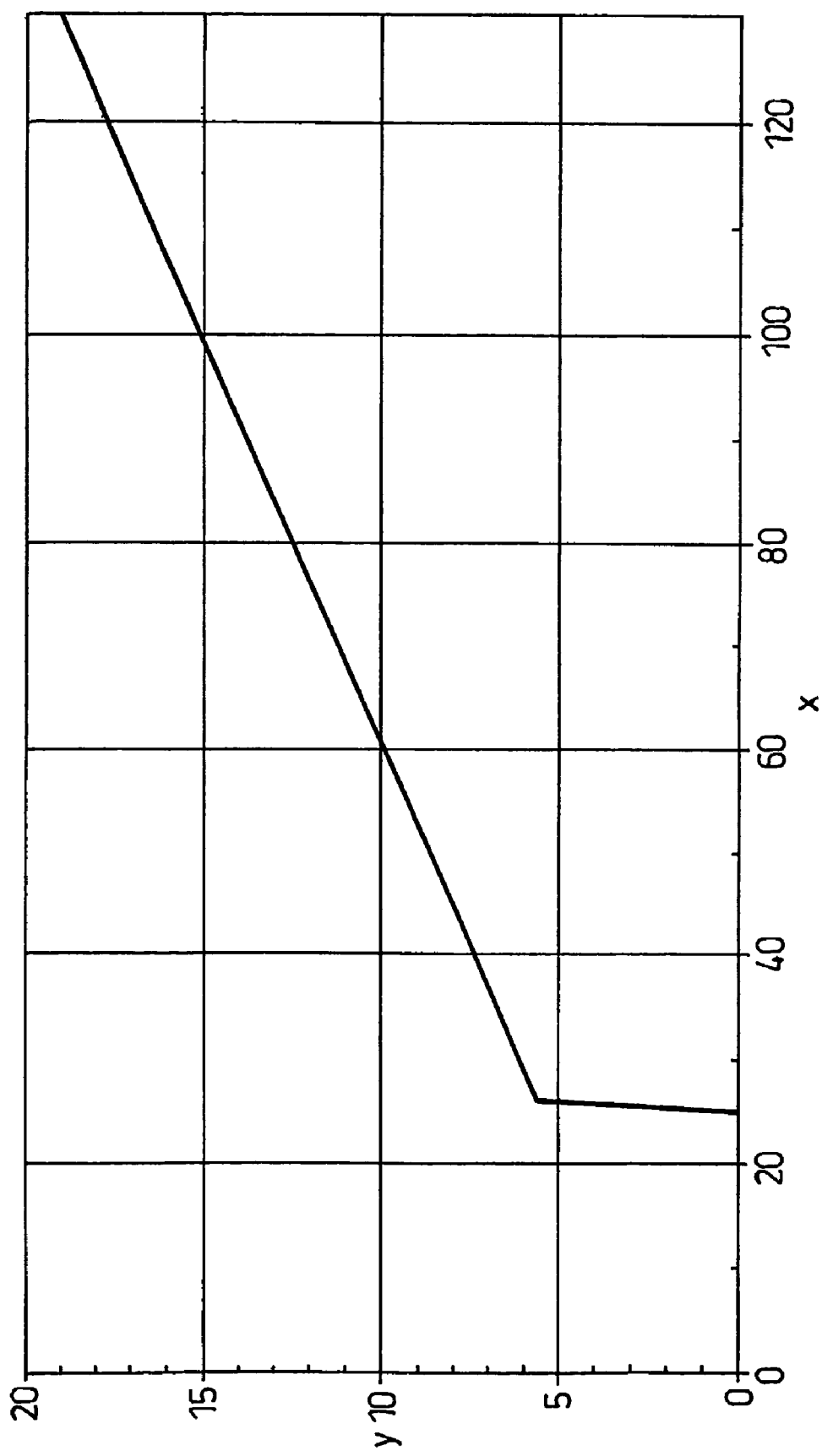
FIG. 4 shows a graph of the confidence additive function on vehicle speed.
Figure 5:
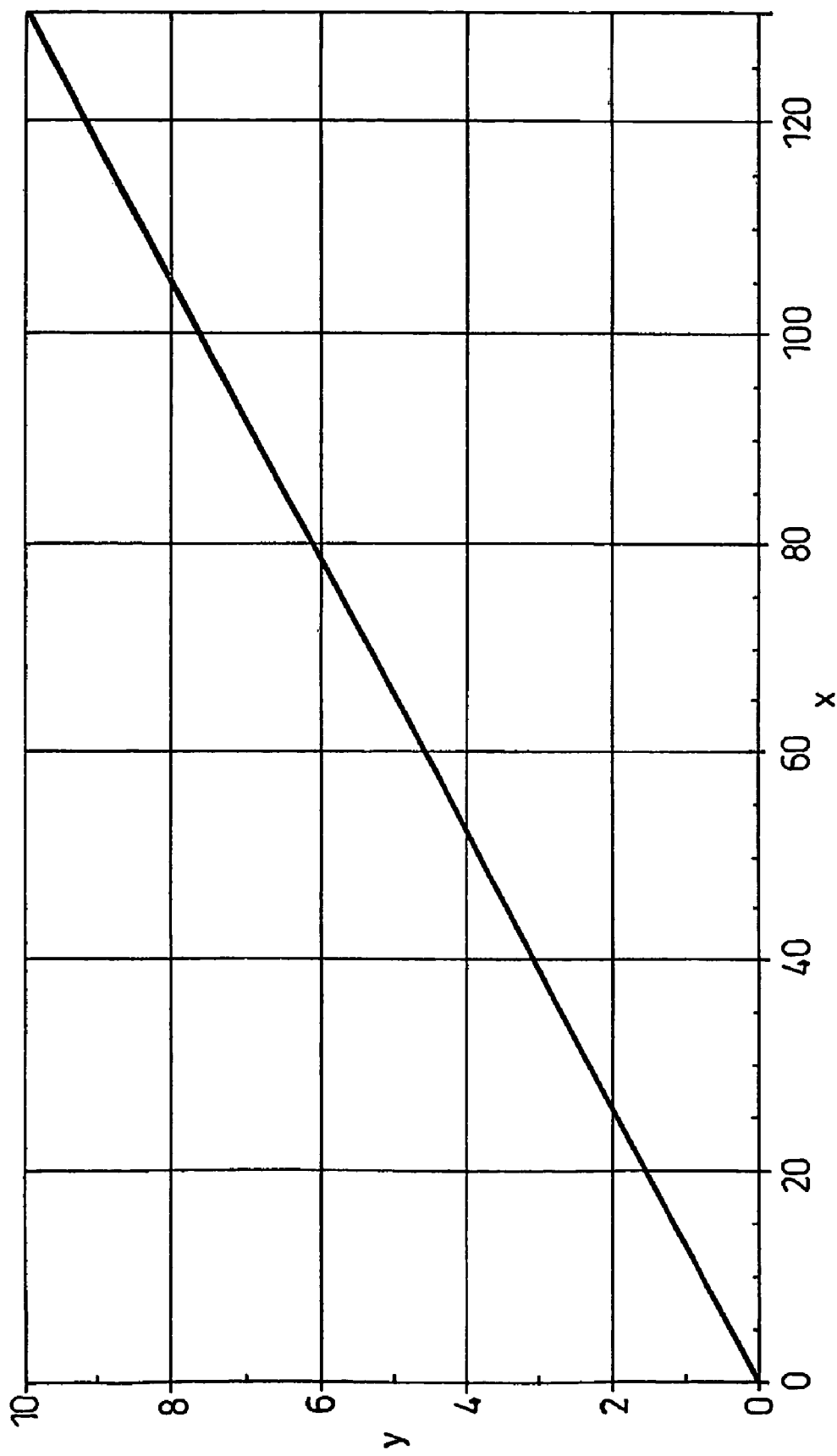
FIG. 5 shows a graph of the confidence additive function on vehicle acceleration.

Term (c) and term (d) increase the confidence 158 more as the vehicle speed and acceleration increase, as both of these factors make it more likely that the system is receiving transmissions from the transmitters 106, 108 associated with the wheels 102, 104 of the vehicle 100 rather than those of a passing, and hence different, vehicle. The increment due to term (c) can be seen in FIG. 4, where the x-axis represents the speed of the vehicle 100 in miles per hour and the y-axis represents the confidence increment, whilst the increment due to term (d) can be seen in FIG. 5, where the x-axis represents the change in speed in miles per hour between two speed samples and the y-axis represents the confidence increase.

Figure 6:
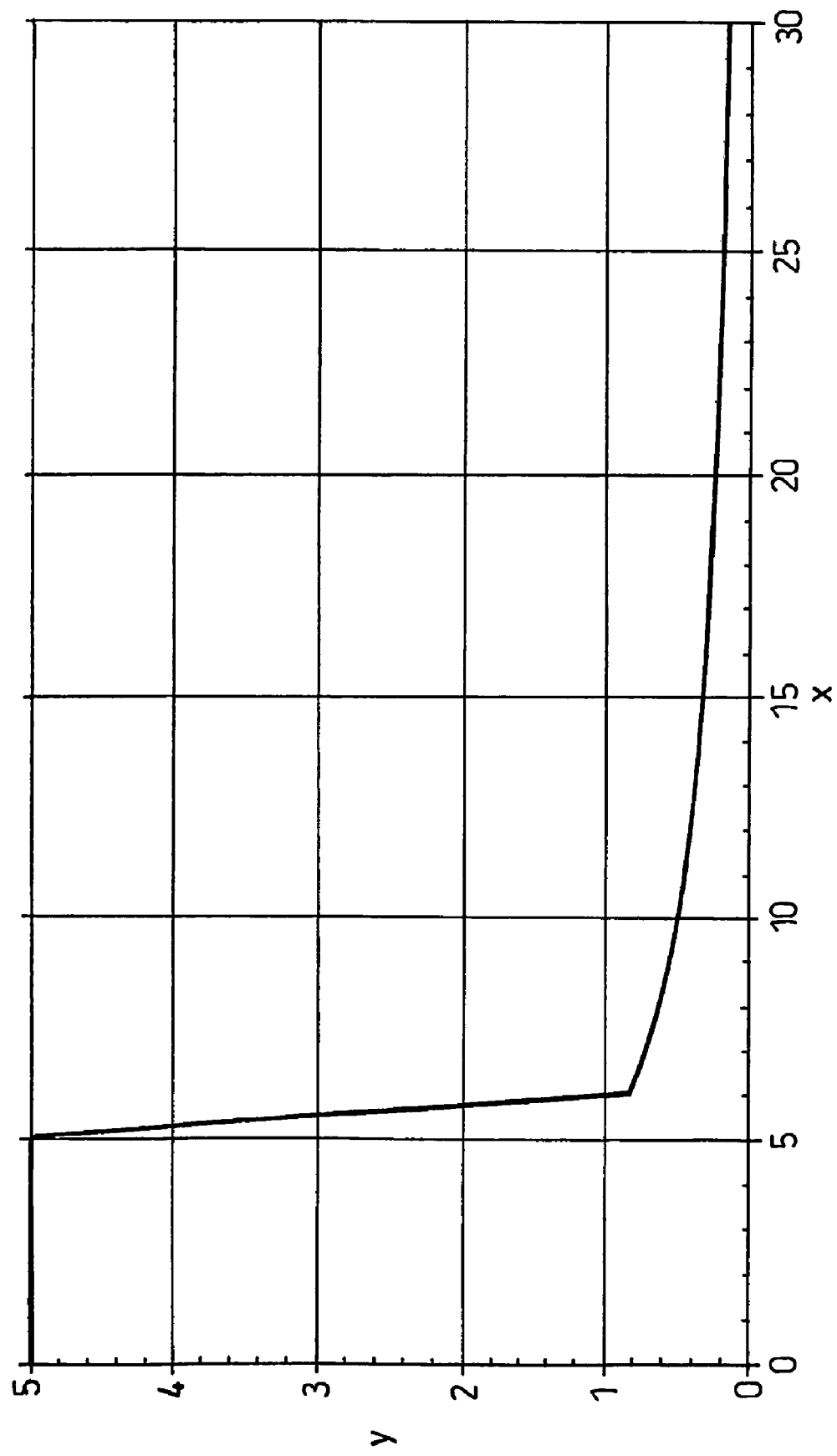
FIG. 6 shows a graph of the confidence additive function on the number of transmitters present.

Term (e) causes an increase in confidence 158 if transmissions from fewer transducers 106, 108 have been previously seen. This is advantageous, especially when the system is in its "virgin" state—that is when the system is first activated and hence neither list 150, 152 contain any items 154—and it is desired to increase the increment in confidence 158 in any transmissions that are received, as it is likely that the vehicle 100 is in an isolated environment. As the number of transmitters 106, 107, 108, 109 seen increases it is less likely that any given one is associated with the vehicle 100. The increment due to this term can be seen in FIG. 6, where the x-axis represents the number of transmitters 106, 107, 108, 109 seen and the y-axis represents the confidence increment.

If the transmission indicates that a transmitter 106, 107, 108, 109 has entered an alert state the increment described above is divided by the number of times the transmitter 106, 108 repeats the alert state transmission.

The confidence 158 increase is subject to a maximum value of the confidence 158. It is envisaged that this maximum confidence be 100.

As the confidences 158 of the candidates increase, the system looks to promote those candidates having a confidence 158 greater than a member threshold (say 70) to the member list 150. However, there must be a vacancy in the member list 150. If there is a vacancy, the item 154 corresponding to the candidate is copied to the member list 150 and deleted from the candidate list 152. Otherwise, the candidate remains on the candidate list 152.

If the ID 156 is not known and there is a vacancy in the candidate list 152, the system creates a new item 154. To this, the system assigns the ID 156 received and a confidence 158 according to the variables described for the confidence increase. If there is no vacancy in the candidate list 152 then the candidates are checked to see if any of their respective confidences 158 are below an overflow swap confidence (say 24). If so, a new item 154 is created and replaces the low confidence item 154. Otherwise, no new item 154 is added, the transmission is discarded and an error condition is signalled.

A new item 154 is initially assigned a confidence 158 of zero, but the system then proceeds to increase the confidence 158 of the item 154 as described above for a previously known item 154.

A check is then made whether any members can be demoted to the candidate list 152. This occurs when the confidence 158 of a member falls below a member removal threshold (say 50) and where there is a candidate with a confidence 158 above the member threshold. This corresponds to the situation where the system lacks sufficient confidence 158 in the transmissions from the transmitter 106, 108 of a given wheel 102, 104 and there is a different transmitter 106, 108 from which transmissions have given the system a greater confidence that the latter transmitter 106, 108 is associated with a wheel 102, 104 which belongs to the vehicle 100. This could happen, for example, if a wheel 102, 104 has been changed. In this case, the member moves to the candidate list 152 and the candidate moves to the member list 150. Otherwise the system increases the confidence 158 of the member to one unit more than the member removal threshold, so as to avoid unnecessary checking when the next transmission is received.

Performing this check now, as well as in the stage where the confidences 158 are decreased (as described below) provides for speedy insertion of a replaced tyre's details into the member list 150.

Meanwhile, the confidences 158 of all the items 154 on both lists 150, 152 are decreased by a set confidence decrement (say 15) at a set interval of approximately 8 minutes. The decrement is subject to a minimum confidence of zero. A check, similar to that which is made when a transmission is received, is then made to check whether any members can be demoted to the candidate list 152. This, again, occurs when the confidence 158 of a member falls below the member removal threshold and where there is a candidate with a confidence 158 above the member threshold. Once more, if this is true the member is moved to the candidate list 152 and the candidate moved to the member list 150.

If the probability of receiving transmissions is only 50% then the basic learn weight should be at least double the confidence time decrement described above such that for an item 154 the confidence 158 is reduced if more than two consecutive transmissions have not been received.

A check is then made of candidates to ascertain whether any candidates may be deleted. Any candidate with a confidence 158 of less than a candidate removal threshold (say 10) is deleted from the candidate list 152 such that an empty position on the list 152 becomes available. By these means any transmissions from transmitters 106, 108 associated with wheels that do not belong to the vehicle 100 may be ignored.

Additionally, the system uses the initiator modules 114 in order to find out or "auto-locate" in which position each wheel 102, 104 is located. This procedure may be initiated as the vehicle 100 is started or, in an alternative, periodically at a predetermined period of time. The system uses the initiator modules 114 positioned adjacent to each road wheel 102 sequentially to periodically request that the transmitter 106 associated with the respective wheel 102 transmit immediately. The system then listens for a predetermined auto-locate timeout period of, say, 4 seconds for responses from the respective wheel 102. If either none, or more than one transmission is received in this period, the system re-attempts auto-location by using the initiator modules 114. The system allows up to a predetermined constant number of auto-locate error attempts of both too many and a lack of received transmissions before abandoning determining which tyre is at that location, signalling an error condition and proceeding to determining which tyre is at the next location.

If, however, precisely one transmission from a single ID is received within the auto locate timeout period, the system checks whether the transmission matches that of a member of the member list 150. If so, and the member has an index 160 which refers to the position being checked, the confidence 158 of the member is increased to the maximum, and the system proceeds to determine which wheel 102, 104 is at the next location.

If, on the other hand, a member corresponding to the transmission received is not found, or it is found to be in the wrong position, a confirmation is requested. In this case, the system activates the relevant in itiator module 114 and again waits for a received signal, and the above procedure is followed once more. This subsequently received transmission is checked to see if it matches the transmission for which confirmation is necessary. This procedure is repeated until two successive matching transmissions have been received.

Once this is the case, the system deletes all items 154 in the member list 150 the position of which has yet to be determined, as this situation is indicative that the rest of the table is incorrect. The system then replaces the item 154 referring to the location being determined with that received in the confirmed transmission, with the maximum confidence possible. If necessary, a candidate corresponding to the new member is deleted.

The system then proceeds to check each of the other locations in turn. As the spare wheel 104 lacks an initiator module 114, this position is not ascertainable using such an initiator module 114. However, as it is the only wheel 102, 104 that lacks an initiator module 114, its position is deducible by a process of elimination.

Confirmation of the position of the spare as against the road wheels can be found by checking that the rotational speed of the wheel determined to be the spare wheel is substantially zero when the vehicle is moving. As indicated previously, this type of check may also be used in the modified form of the first embodiment of the invention to determine which of the transmissions refer to the spare wheel.

The system is further provided with a display 118 view able by a user of the vehicle 100. This displays the pressure data received by member transmitters 106, 107, 108, 109 along with the location to which each transmitter 106, 107, 108, 109 refers. Therefore the display 118 only shows the air pressure within tyres on wheels 102, 104 in which the system has sufficient confidence 158 that the wheels 102, 104 are associated with the vehicle 100. Accordingly, a user of the vehicle 100 can generally be satisfied that the data displayed on the display 118 correspond to that of the wheels 102, 104 of the vehicle 100.

In normal use any error condition raised by the system will not be apparent to the user. However, if, after several requests by the initiator module 114 corresponding to a certain location, there is no response from any transmitter 106 at a given location, a warning is displayed to the user that either the transmitter 106 in the wheel 102 at that location is not functioning or that the wheel 102 itself is missing. Furthermore, the system may be placed into a diagnostic mode, such that may be used by a technician servicing the system, in which any errors are visible along with the IDs 156 and confidences 158 of all items 154 in both lists 150, 152. This may prove useful in case of a fault.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A tyre pressure monitoring system for a vehicle comprising:
   at least one receiver responsive to signals transmitted by transmitters, with each transmitter associated with a vehicle tyre;
   a memory;
   a list of identity tags captured by said receiver from signals transmitted by said transmitters stored in said memory;
   a list of confidence values also stored in said memory, each of said confidence values associated with one of said identity tags; and
   a control unit in communication with said receiver and said memory, said control unit operative to modify said confidence values with each of said confidence values being indicative of a confidence that said associated stored identity tag corresponds to a transmitter of a tyre associated with said vehicle such that, over time, the system is able to capture and learn the identities of tyres that belong to the vehicle and distinguish from tyres that do not belong to the vehicle, said control unit also operative to monitor at least one parameter of said vehicle and said received signals to determine a confidence value associated with an identity tag with one of said at least one parameters being a speed of said vehicle.

2. A tyre pressure monitoring system according to claim 1 wherein said system adds newly received identity tags to said identity tag list whenever a signal containing one of said newly received tags is received by said receiver, where said new identity tags may include tags captured from transmitters not associated with one of said vehicle tyres.

3. A tyre pressure monitoring system according to claim 1 wherein said identity tags are ranked in order in said identity tag list according to a value of said confidence value associated with each of the stored identity tags.

4. A tyre pressure monitoring system according to claim 1 wherein said identity tags are stored in a list which comprises a member list and a candidate list, where said identity tags may include tags captured from transmitters not associated with one of said vehicle tyres and with only identity tags which have attained a corresponding confidence value that meets a first predetermined criterion being stored in said member list and identity tags which have not obtained said corresponding confidence value being kept in said candidate list.

5. A tyre pressure monitoring system according to claim 4 wherein said first criterion is that a confidence value is above an acceptable threshold.

6. A tyre pressure monitoring system according to claim 5 wherein said system is adapted to generate a warning signal to alert a driver in a case where none of said stored identity tags will have a sufficiently high confidence value to be allocated to said member list.

7. A tyre pressure monitoring system according to claim 4 wherein said member list contains as a maximum as many identity tags as there are tyres that belong to said vehicle.

8. A tyre pressure monitoring system according to claim 7 wherein said system includes means for identifying how many tyres belong to said vehicle to determine how many corresponding identity tags may be allocated to said member list.

9. A tyre pressure monitoring system according to claim 8 wherein said member list contains a number of tags, and wherein said number of tags allocated to said member list is varied in an event that a trailer is attached to said vehicle.

10. A tyre pressure monitoring system according to claim 4 wherein said allocation of identity tags to said list and generation of associated confidence values is performed by a processing unit which forms a part of said system, which includes an input for receiving input signals received by said receiver from any transmitters which are within its range.

11. A tyre pressure monitoring system according to claim 10 wherein said transmitters are associated with tyres that belong to one of said vehicle another vehicle that is alongside said vehicle.

12. A tyre pressure monitoring system according to claim 10 wherein each transmitter is adapted to transmit a signal which comprises a pressure reading for a tyre associated with said transmitter in addition to an identity tag.

13. A tyre pressure monitoring system according to claim 12 wherein each transmitter is fitted in a position that is one of adjacent to a tyre and within a tyre together with at least one sensor which measures pressure within said tyre.

14. A tyre pressure monitoring system according to claim 13 further including at least one sensor that measures the temperature within the tyre.

15. A tyre pressure monitoring system according to claim 13 further including at least one wheel rotational speed sensor.

16. A tyre pressure monitoring system according to claim 12 wherein said pressure reading signal is a pressure value indicative of pressure.

17. A tyre pressure monitoring system according to claim 12 wherein said pressure reading signal comprises a warning signal which is generated whenever said pressure reading falls below a predetermined safe level.

18. A tyre pressure monitoring system according to claim 12 wherein said pressure reading signal is transmitted periodically together with the identity tag.

19. A tyre pressure monitoring system according to claim 12 wherein said processing unit presents only pressure signals extracted from received signals that are sent by transmitters that are stored in said member list to a display unit.

20. A tyre pressure monitoring system according to claim 19 wherein a combined pressure reading value taken from all of said transmitters in said member list is presented.

21. A tyre pressure monitoring system according to claim 19 wherein a warning is presented in an event that any one of said pressure readings in said member list drops below a predetermined level.

22. A tyre pressure monitoring system according to claim 4 wherein said processing unit is adapted to remove stored identity tags from one of said member list and said candidate list if they have an associated confidence value that meets a second predefined criterion.

23. A tyre pressure monitoring system according to claim 22 wherein said second criterion corresponds to a minimum confidence value so that tags may be removed from said lists if said confidence value drops below a predefined level.

24. A tyre pressure monitoring system according to claim 22 wherein in an event that a tag is removed from said member list, said system performs a search of tags remaining in said memory to see if there are any suitable candidates to add to said member list.

25. A tyre pressure monitoring system according to claim 24 wherein in an event that no suitable candidates exist an error flag is raised and an alarm issued to a driver.

26. A tyre pressure monitoring system according to claim 1 wherein said system includes a single receiver which receives signals from any transmitters which are within range, said range being sufficient for said receiver to pick up signals from each road wheel fitted to said vehicle.

27. A tyre pressure monitoring system according to claim 4 wherein to determine a confidence value associated with an identity tag the system is adapted to monitor at least one parameter of said received signals.

28. A tyre pressure monitoring system according to claim 27 wherein, if for an identily tag a confidence value already exists then said confidence value is adjusted whenever subsequent signals are received in accordance with said monitored parameters at a time of receipt of said later signals.

29. A tyre pressure monitoring system for a vehicle comprising:

at least one receiver responsive to signals transmitted by transmitters, with each transmitter associated with a vehicle tyre;

a memory;

a list of identity tags captured by said receiver from signals transmitted by said transmitters stored in said memory;

a list of confidence values also stored in said memory, each of said confidence values associated with one of said identity tags; and a control unit in communication with said receiver and said memory, said control unit operative to modify said confidence values with each of said confidence values being indicative of a confidence that said associated stored identity tag corresponds to a transmitter of a tyre associated with said vehicle such that, over time, the system is able to capture and learn the identities of tyres that belong to the vehicle and distinguish from tyres that do not belong to the vehicle, said control unit also operative to remove stored identity tags from one of said member list and said candidate list if they have an associated confidence value that meets a predefined criterion.

30. A tyre pressure monitoring system according to claim 4 wherein to determine a confidence value associated with an identity tag the system is adapted to monitor at least one parameter of said vehicle.

31. A tyre pressure monitoring system according to claim 30 wherein new identity tags are not added to the memory unless the vehicle speed exceeds or at least meets a predefined threshold.

32. A tyre pressure monitoring system according to claim 30 wherein said system allocates a higher confidence value to an identity tag which is extracted from a signal that is received when said vehicle speed exceeds a predefined threshold.

33. A tyre pressure monitoring system according to claim 27 wherein, in an event that a confidence value has not already been allocated to an identily tag, then a value is produced dependent upon said at least one parameter corresponding to a single received signal.

34. A tyre pressure monitoring system according to claim 27 wherein one of said parameters is a number of times that signals are received which have identical identity tags, said confidence value increasing the more times that a signal is received.

35. A tyre pressure monitoring system according to claim 4 wherein one of said parameters is the number of other identity tags that are already stored in said memory.

36. A tyre pressure monitoring system according claim 27 wherein one of said parameters is the elapsed time between receiving signals having the same identity tag.

37. A tyre pressure monitoring system according to claim 36 wherein said confidence values stored in said memory are reduced at set time intervals, and increased whenever a signal is received.

38. A tyre pressure monitoring system according to claim 37 wherein said transmitters are adapted to periodically transmit signals containing their identity tag with a period by which said confidence value is reduced being chosen to be greater than said transmission period.

39. A tyre pressure monitoring system according to claim 20 wherein said parameters that are used to determine said confidence value are input to at least one algorithm which determines a new confidence value for a previously unknown identity tag.

40. A tyre pressure monitoring system according to claim 39 wherein said algorithm determines an additive function for each monitored parameter, with each of said additive functions being added together to form a confidence value.

41. A tyre pressure monitoring system according to claim 26 wherein said system is provided with at least one initiator associated with each wheel, said initiator being adapted to send out a prompt signal to any transmitters within its range, each of said transmitters being adapted to send a signal including its identity tag back to said receiver in response to said prompt from said initiator.

42. A tyre pressure monitoring system according to claim 26 wherein said range is sufficient to pick up signals sent from a spare wheel of said vehicle.

43. A tyre pressure monitoring system according to claim 41 wherein said initiator is directional such that it only initiates a transmitter of a vehicle tyre nearest to said initiator.

44. A tyre pressure monitoring system according to claim 41 wherein said initiator has a limited range such that it only initiates a transmitter of a vehicle tyre nearest to said initiator.

45. A tyre pressure monitoring system according to claim 41 wherein each initiator comprises a low frequency coil which transmits a burst of low frequency radiation when energised.

46. A tyre pressure monitoring system according to claim 41 wherein said transmitters transmit "prompted" return signals in addition to periodic signals which include an identity tag.

47. A tyre pressure monitoring system according to claim 46 wherein said prompted signals are used to determine a position of said relevant transmitters with said periodic signals being used only for allocating said identity tags to said list.

48. A tyre pressure monitoring system according to claim 41 wherein said processing unit is adapted to operate each initiator unit in turn and listen for receiving signals following a prompt from an initiator.

49. A tyre pressure monitoring system according to claim 48 wherein, if no signals are received within a set time duration, said processing unit is adapted to signal an error upon no signals being received with a set time duration.

50. A tyre pressure monitoring system according to claim 48 wherein, if transmissions are received from more than one transmitter within a set time duration, said processing unit is adapted to either signal an error or to repeat said process for that initiator.

51. A tyre pressure monitoring system according to claim 48 wherein, if transmissions are only received from a single transmitter within a set time duration, said processing unit is adapted to store said transmitter identity tag in said memory as a member together with the location of said initiator used and assign it a maximum possible confidence value.

52. A tyre pressure monitoring system according to claim 51, wherein said processing unit is adapted to require confirmation of said received identity tag before storing it as a member by first re-activating an initiator.

53. A tyre pressure warning system comprising:
an initiator associated with each road wheel of a vehicle which is in use;
a receiver which receives signals from any transmitters which are within an operational range of said receiver;
a processor in communication with said receiver, said processor operative to process said received signals;
a memory in communication with said processor;
a list of identity tags captured by said receiver from said received signals stored in said memory;
a list of confidence values also stored in said memory, each of said confidence values associated with one of said identity tags and indicative of a confidence that the system has that said identity tag corresponds to a transmitter that belongs to said vehicle with said processor also being operative to modify said confidence values to learn which transmitters belong to said vehicle, and to learn where said learnt transmitters are located on said vehicle by monitoring in turn signals received said transmitters in response to a prompt from each initiator, said processor further being operative to monitor at least one parameter of said vehicle and said received signals to determine a confidence value associated with an identity tag with one of said at least one parameters being a speed of said vehicle.

54. The tyre pressure warning system of claim 53 wherein said receiver is adapted to receive signals over a range which includes all tyres fitted to said vehicle as well as those that are in use and also may include signals captured from transmitters not associated with one of said vehicle tyres.

55. The tyre pressure warning system of claim 54 wherein said range includes tyres fitted to a trailer fitted to said vehicle.

56. The tyre pressure warning system of claim 53 wherein each of said tyres fitted to said vehicle is provided with a transmitter.

57. The tyre pressure warning system of claim 56 wherein each transmitter is a radio frequency RF transmitter.

58. A tyre pressure monitoring system according to claim 30 wherein one of said parameters is a rate of change of vehicle speed over time.

59. A tyre pressure monitoring system according to claim 58 wherein said confidence value is increased in the event that a rate of change of speed of said vehicle whilst receiving signals exceeds a predetermined threshold.

60. A tyre pressure monitoring system according to claim 13 wherein said receiver is adapted to determine the rotational speed of a wheel by analysing received transmissions from said transmitter.

61. A tyre pressure monitoring system according to claim 4 wherein, in an event that a confidence value has not already been allocated to an identity tag, then a value is produced dependent upon said at least one parameter corresponding to a series of at least one of the received signals with the same identity tag.

* * * * *